US012583975B2

(12) United States Patent
Ogawa et al.

(10) Patent No.: US 12,583,975 B2
(45) Date of Patent: Mar. 24, 2026

(54) UV-CURABLE ORGANOPOLYSILOXANE COMPOSITION AND USE THEREOF

(71) Applicants: DOW TORAY CO., LTD., Tokyo (JP); DOW SILICONES CORPORATION, Midland, MI (US)

(72) Inventors: Takuya Ogawa, Ichihara (JP); Yungjin Park, Chungbuk (KR); Hyochul Kim, Chungbuk (KR); Peng-Fei Fu, Midland, MI (US)

(73) Assignees: DOW TORAY CO., LTD., Shinagawa-ku (JP); DOW SILICONES CORPORATION, Midland, MI (US)

(*) Notice: Subject to any disclaimer, the term of this patent is extended or adjusted under 35 U.S.C. 154(b) by 932 days.

(21) Appl. No.: 17/764,711

(22) PCT Filed: Oct. 1, 2020

(86) PCT No.: PCT/JP2020/037394

§ 371 (c)(1),
(2) Date: Mar. 29, 2022

(87) PCT Pub. No.: WO2021/066084

PCT Pub. Date: Apr. 8, 2021

(65) Prior Publication Data

US 2022/0348722 A1 Nov. 3, 2022

(30) Foreign Application Priority Data

Oct. 3, 2019 (JP) ................................ 2019-182975

(51) Int. Cl.

*C08L 83/04* (2006.01)
*C08G 77/18* (2006.01)
*C09D 183/06* (2006.01)
*C09J 183/06* (2006.01)

(52) U.S. Cl.

CPC ........... *C08G 77/18* (2013.01); *C09D 183/06* (2013.01); *C08L 83/04* (2013.01); *C09J 183/06* (2013.01)

(58) Field of Classification Search

CPC ....... C09J 183/06; C08L 83/04; C09D 183/06
USPC ..................................... 525/476; 106/287.14
See application file for complete search history.

(56) References Cited

U.S. PATENT DOCUMENTS 4,077,943 A 3/1978 Sato et al.
2006/0178444 A1* 8/2006 Frances ................. A61K 6/887 522/7
2009/0246540 A1* 10/2009 Irifune .................. C08G 77/14 522/31
2013/0203882 A1 8/2013 Cherkaoui et al.
2014/0050900 A1 2/2014 Kodama et al.

FOREIGN PATENT DOCUMENTS

JP S5239751 A 3/1977
JP S6422967 A 1/1989
JP 2002526390 A 8/2002
JP 2009242588 A 10/2009
JP 2009298887 A 12/2009
JP 2013525551 A 6/2013
JP 2018080311 A 5/2018
JP 2018111792 A 7/2018
JP 2020098684 A 6/2020
WO 2016167347 A1 10/2016
WO 2017159190 A1 9/2017

OTHER PUBLICATIONS

English translation of International Search Report for PCT/JP2020/037394 dated Jan. 12, 2020, 3 pages.
Machine assisted English translation of JP2009298887A obtained from https://patents.google.com/patent on Oct. 12, 2022, 8 pages.
Machine assisted English translation of WO2016167347A1 obtained from https://patents.google.com/patent on Oct. 12, 2022, 17 pages.
Machine assisted English translation of JP2018111792A obtained from https://patents.google.com/patent on Oct. 12, 2022, 13 pages.
Machine assisted English translation of JP2020098684A obtained from https://patents.google.com/patent on Oct. 12, 2022, 11 pages.
Machine assisted English translation of JP2018080311A obtained from https://patents.google.com/patent on Oct. 12, 2022, 13 pages.
Machine assisted English translation of WO2017159190A1 obtained from https://patents.google.com/patent on Oct. 12, 2022, 31 pages.

* cited by examiner

*Primary Examiner* — Margaret G Moore
(74) *Attorney, Agent, or Firm* — Warner Norcross + Judd LLP

(57) ABSTRACT

An ultraviolet (UV) curable organopolysiloxane composition with excellent workability when applied to a substrate is provided, in which a product obtained by curing the composition has a low dielectric constant. The UV curable organopolysiloxane composition comprises (A) one or more organosiloxane and/or organopolysiloxane having an average of two or more UV reactive functional groups in one molecule, and (B) one or more organosilane, organosiloxane, and/or organopolysiloxane having one UV reactive functional group in one molecule. An organic solvent is not included in the composition. In addition to components (A) and (B), the composition can comprise one or a plurality of additives selected from a group consisting of: (D1) nonionic surfactants not containing a silicon atom and are not acrylic; (D2) nonionic surfactants containing a silicon atom and having an HLB value of 4 or less; and (D3) silicone oils with a viscosity of 90 mPa-s or less at 25° C.

19 Claims, No Drawings

UV-CURABLE ORGANOPOLYSILOXANE COMPOSITION AND USE THEREOF

CROSS-REFERENCE TO RELATED APPLICATIONS

This application is the U.S. National Stage of International Application No. PCT/JP2020/037394 filed on 1 Oct. 2020, which claims priority to and all advantages of Japanese Application No. 2019-182975 filed on 3 Oct. 2019, the content of which is incorporated herein by reference.

TECHNICAL FIELD

The present invention relates to UV curable organopolysiloxane composition containing an organosiloxane and/or organopolysiloxane that can be cured by actinic rays, such as ultraviolet rays or electron beams, and particularly relates to a UV curable organopolysiloxane composition in which a cured product obtained therefrom has a low dielectric constant. The curable organopolysiloxane composition of the present invention has a low dielectric constant of less than 2.8 and is suitable as an insulating material for electronic and electrical devices, and particularly as a material for use as a coating agent.

BACKGROUND ART

Due to high heat resistance and excellent chemical stability, silicone resins have been used as coating agents, potting agents, insulating materials, and the like for electronic and electrical devices. Silicone resins include UV curable silicone compositions.

For example, the Japanese Unexamined Patent Application 2009-298887 discloses a curable composition for an optical component containing epoxy-modified silicone and/or oxetane-modified silicone, a cationic polymerizable monomer, and a cationic polymerization initiator. Herein, monofunctional compounds containing a silicon atom are not exemplified as the cationic polymerizable monomer.

Japanese PCT Application 2013-525551 discloses a UV curable composition containing a disiloxane having a cationic polymerizable functional group, a polysiloxane having 9 or more silicon atoms having a cationic polymerizable functional group, an epoxy component and/or oxetane component not containing a siloxane group, and a cationic photoinitiator.

Furthermore, WO 2016/167347 discloses a sealing agent for an electronic device containing a silicone compound having a UV reactive group and that can be applied by an inkjet method. Herein, monofunctional compounds having a UV reactive group and not containing a silicon atom are not exemplified.

Furthermore, the Japanese Unexamined Patent Application 2018-111792 discloses a UV curable resin composition containing a polyfunctional cationic polymerizable compound, a monofunctional cationic polymerizable compound with a viscosity of 8 mPa-s or less, and a cationic curing catalyst. Compounds containing a silicon atom are not exemplified as the monofunctional cationic polymerizable compound herein.

Furthermore, Japanese Unexamined Patent Application 2020-98684 describes a compound containing a curable resin having a low molecular weight silicone compound, a photocationic polymerization initiator, and an acrylic surfactant not having a Si atom as a resin composition for cationic polymerization curing inkjet for sealing an organic EL element, and describes using the acrylic surfactant not containing an Si to improve initial wet spreading properties when applying to a substrate.

RELATED ART DOCUMENTS

Patent Documents

Patent Document 1: Japanese Unexamined Patent Application 2009-298887

Patent Document 2: Japanese PCT Application 2013-525551

Patent Document 3: WO 2016/167347

Patent Document 4: Japanese Unexamined Patent Application 2018-111792

Patent Document 5: Japanese Unexamined Patent Application 2020-98684

SUMMARY OF THE INVENTION

Problem to be Solved by the Invention

As described above, there are several known UV curable organopolysiloxane compositions that combine compounds with a plurality of UV reactive functional groups for use in materials for electronic devices and other applications, but a UV curable organopolysiloxane composition, in which a cured product thereof has a low dielectric constant and having excellent workability for applying to a substrate, and particularly low viscosity, is still in demand. An object of the present invention is to provide a UV curable organopolysiloxane composition, in which a product obtained by curing has a low dielectric constant, with particularly excellent workability when applied to a substrate and favorable storage stability at ambient temperature.

Means for Solving the Problem

It was discovered that by controlling a crosslinked structure of an organosiloxane and/or organopolysiloxane having a functional group that can be cured by irradiating energy rays that can cause a chemical reaction, such as ultraviolet rays, electron beams, or the like, a resulting cured product can have a low dielectric constant. Furthermore, the curable composition has low viscosity and excellent workability when applied to a substrate, thereby completing the present invention.

The present invention relates to a UV curable organopolysiloxane composition, and the composition is cured by forming a bond by a UV reactive functional group. However, the curing method is not limited to UV irradiation, and an arbitrary method in which a UV curable functional group can cause a curing reaction can be used. For example, electron beam irradiation may be used to cure the composition of the present invention.

A composition of the present invention contains as an essential component:

(A) one or more organosiloxane and/or organopolysiloxane having an average of two or more UV reactive functional groups in one molecule; and (B) one or more organosilane, organosiloxane, and/or organopolysiloxane having one UV reactive functional group in one molecule; where an organic solvent is not included in the composition.

In the composition, the organosiloxane or organopolysiloxane of component (A) is preferably a straight chain, branched, or cyclic organopolysiloxane expressed by average compositional formula:

$$R_aR'_bSiO_{(4-a-b)/2} \quad (1)$$

(where R is a UV reactive functional group,

R' is a group other than the UV curable functional group, selected from monovalent hydrocarbon groups, hydroxyl groups, and alkoxy groups, and a and b are numbers that satisfy the following conditions: 1≤a+23 3 and $0.01 \leq a/(a+b) \leq 0.34$, and having at least two Rs in a molecule.).

Furthermore, the organosilane, organosiloxane, and/or organopolysiloxane of component (B) is preferably a straight chain, branched, or cyclic organopolysiloxane, or an organosilane expressed by average compositional formula:

$$R_cR'_dSiO_{(4-c-d)/2} \quad (2)$$

(where R and R' are the same groups as described above, c and d are numbers that satisfy the following conditions: $1<c+d\leq 4$ and $0.05\leq c/(c+d)\leq 0.25$, and the number of Rs in the molecule is 1.).

Alternatively, in the composition, the organosiloxane or organopolysiloxane of component (A) is preferably one or more type of organosiloxane and/or organopolysiloxane having a UV reactive functional group, selected from a group consisting of:

organopolysiloxanes or organosiloxanes expressed by the following formula (3):

[Formula 1]

(3)

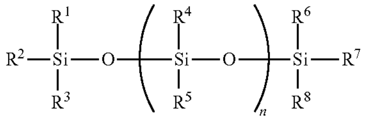

(where two or more of all $R^1$ to $R^8$ groups per molecule is a UV reactive functional group; the other $R^1$ to $R^8$ groups are independently a monovalent hydrocarbon group unsubstituted or substituted with fluorine; and n is a numerical value in which the viscosity of a (poly) organosiloxane expressed by Formula (3) is 1 to 1000 mPa-s at 25° C., and n may be 0);

organopolysiloxanes expressed by average unit formula:

$$(R_3SiO_{1/2})_e(R_2SiO_{2/2})_f(RSiO_{3/2})_g(SiO_{4/2})_h \quad (4)$$

(where R is independently a group selected from UV reactive functional groups, monovalent hydrocarbon groups unsubstituted or substituted with fluorine, at least two of all Rs are UV curable functional groups, (g+h) is a positive number, e is 0 or a positive number, and f is a number within a range of 0 to 100.); and mixtures of two or more organosiloxanes and/or organopolysiloxanes arbitrarily selected therefrom.

The organosilane, organosiloxane, and/or organopolysiloxane of component (B) is preferably a silicon-containing compound having one UV reactive functional group in a molecule, selected from a group consisting of:

organopolysiloxanes or organosiloxanes expressed by the following formula (3'):

[Formula 2]

(3')

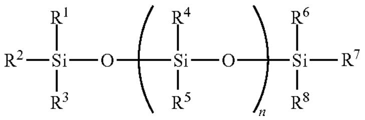

(where of all $R^1$ to $R^8$ groups, only one UV reactive functional group is present in a molecule; the other $R^1$ to $R^8$ groups are independently a monovalent hydrocarbon group unsubstituted or substituted with fluorine; and n is a numerical value in which the viscosity of a (poly)organosiloxane expressed by Formula (3') is 1 to 100 mPa-s at 25° C., and n may be 0);

cyclic organopolysiloxanes expressed by the following formula (5):

[Formula 3]

(5)

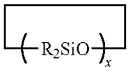

(where R is independently a group selected from UV reactive functional groups and monovalent hydrocarbon groups unsubstituted or substituted with fluorine, x is an integer of 3 to 10, and only one UV reactive functional group is provided in a molecule); organosilanes expressed by the following formula (6):

$$RSiR'_3 \quad (6)$$

(where R is a UV reactive functional group, and R' is a group selected from monovalent hydrocarbons, hydroxyl groups, and alkoxy groups excluding the UV reactive functional group).

The UV reactive functional group is preferably a cationic polymerizable functional group, and the cationic polymerizable functional group is preferably an epoxy group-containing group.

In component (A) above, the number of UV reactive functional groups in component (A) is preferably 2 to 4 per molecule on average.

In component (A) above, the UV reactive functional group of component (A) is preferably an epoxy group-containing group.

In component (B) above, the UV reactive functional group of component (B) is preferably an epoxy group-containing group.

With respect to component (B) above, component (B) is preferably an organosiloxane or organopolysiloxane having one UV reactive functional group in a molecule.

In the composition above, the ratio of component (A) to the total of 100 mass % of component (A) and component (B) is preferably less than 80 mass %.

In the composition above, the ratio of component (A) to the total of 100 mass % of component (A) and component (B) is preferably less than 50 mass %.

The composition may further contain (C) a compound having one or more UV reactive functional groups in one molecule and not having a silicon atom, and the mass ratio of component (C) to the total of component (A), component (B), and component (C) is preferably less than 50%.

Component (C) is preferably a compound having one epoxy group per molecule and not containing an oxetane group and silicon atom.

The composition preferably contains a compound containing an oxetane group in a molecule and substantially not containing a silicon atom.

The viscosity of the composition above measured at 25° C. using an E type viscometer is preferably 100 mPa-s or less, and more preferably within a range of 5 to 50 mPa-s. Furthermore, the dielectric constant of the cured product obtained by curing the composition is preferably less than 2.8.

The present invention further provides an insulating coating agent containing the UV curable organopolysiloxane composition above.

The present invention also provides a method of using a cured product formed from the UV curable organopolysiloxane composition above as an insulating coating layer.

The present invention also provides a display device including a layer containing a cured product formed from the UV curable organopolysiloxane composition above.

Effects of the Invention

The UV curable organopolysiloxane composition of the present invention has moderate viscosity that provides favorable workability when applied to a substrate, and a cured product obtained therefrom has a low dielectric constant. Therefore, the composition is useful for articles containing a low dielectric constant layer in an arbitrary field that uses materials with a low dielectric constant, particularly in low dielectric constant materials for electronic devices, more particularly in materials for an insulating layer, and even more particularly in coating materials.

DESCRIPTION OF THE PREFERRED EMBODIMENT

A configuration of the present invention will be further described in detail below. The UV curable organopolysiloxane composition of the present invention has the following components (A) and (B) as essential components and can contain, if desired, component (C) and components selected from various additives. One of the characteristics of the UV curable organopolysiloxane composition of the present invention is that a cured product obtained from the composition has a low dielectric constant. Although the reason that the dielectric constant of a cured product obtained from the composition of the present invention is low is not necessarily clear, it is assumed that nanoscale vacancies are introduced into the cured product by controlling a crosslinked structure of polysiloxane formed by UV irradiation, which results in a low dielectric constant. The UV curable organopolysiloxane composition of the present invention utilizes the low dielectric constant and favorable workability of the cured product to form an insulating coating agent, and particularly a coating agent for forming an insulating layer in electronic and electrical devices, such as display devices and members thereof, including touch panels, displays, and the like, or in semiconductor devices.

In the following description, the viscosity of a compound is a value measured at 25° C. by an E-type rotational viscometer (unit: mPa-s). Furthermore, the dielectric constant is a value measured by a capacitance method (capacitor method) at 23° C. These measurement methods are well known to a person with ordinary skill in the art.

[Component (A): Organosiloxane and/or Organopolysiloxane Having an Average of Two or More UV Reactive Functional Groups in One Molecule]

The organosiloxane or organopolysiloxane having a UV reactive functional group used as component (A) has two or more UV reactive functional groups per molecule on average in an organosiloxane or organopolysiloxane skeleton, and an arbitrary molecular structure may be used so long as the object is achieved. In general, the organosiloxane or organopolysiloxane of component (A) is a straight chain, branched, or cyclic organopolysiloxane expressed by average compositional formula:

$$R_a R'_b SiO_{(4-a-b)/2} \quad (1)$$

(where R is a UV reactive functional group,

R' is a group selected from monovalent hydrocarbon groups, hydroxyl groups, and alkoxy groups excluding the UV reactive functional group, and a and b are numbers that satisfy the following conditions: $1 \le a+b \le 3$ and $0.01 \le a/(a+b) \le 0.34$.).

The UV reactive functional group expressed by R in formula (1) is an organic group capable of generating a bond between each other by UV irradiation in the presence or absence of a photoinitiator. Examples of the UV reactive functional groups can include radical polymerizable groups and cationic polymerizable groups. Radical polymerizable groups are not particularly limited so long as they are a functional group that can form a new bond by a radical reaction mechanism, and particularly a bond between radical polymerizable groups. Examples can include acrylic groups, methacrylic groups, maleimide groups, and organic groups containing any of these groups. Specific examples of the radical polymerizable group include groups such as acryloxypropyl, methacryloxypropyl, acrylamidopropyl, methacrylamidopropyl, 3-(N-maleimido)propyl, and the like. Examples of cationic polymerizable groups include vinyl ether groups, epoxy group-containing groups, oxetane group-containing groups, and other groups, such as $CH_2{=}CH{-}O{-}(CH_2)_n{-}$ (where n is an integer from 3 to 20), glycidyloxy $-(CH_2)_n-$ (where n is an integer from 3 to 20), 3,4-epoxycyclohexyl $-(CH_2)_n-$ (where n is an integer from 2 to 20), and the like.

One or more types of epoxy group-containing groups are preferred as the UV reactive functional group. An example of a particularly preferred group includes an epoxycyclohexylalkyl group, and particularly a 3,4-epoxycyclohexylethyl group. Straight chain, branched, or cyclic organopolysiloxanes expressed by the average compositional formula above have at least two UV reactive functional groups (R) on average per molecule. The number of UV curable groups is preferably 2 to 6, more preferably 2 to 5, and particularly preferably 2 to 4 per molecule on average.

The monovalent hydrocarbon group expressed by R' is a monovalent hydrocarbon group, which includes unsubstituted monovalent hydrocarbon groups and fluorine-substituted monovalent hydrocarbon groups. The unsubstituted or fluorine-substituted monovalent hydrocarbon group is preferably a group selected from unsubstituted or fluorine substituted alkyl, cycloalkyl, arylalkyl, and aryl groups having 1 to 20 carbon atoms. Examples of the alkyl groups above include methyl, ethyl, n-propyl, isopropyl, n-butyl, tert-butyl, sec-butyl, pentyl, octyl, and other groups, and methyl groups are particularly preferable. Examples of the cycloalkyl groups above include cyclopentyl, cyclohexyl, and the like. Examples of the arylalkyl groups above include benzyl, phenylethyl groups, and the like. Examples of the aryl groups above include phenyl groups, naphthyl groups, and the like. Examples of fluorine-substituted monovalent hydrocarbon groups include 3,3,3-trifluoropropyl and 3,3,4,4,5,5,5,6,6,6-nonafluorohexyl groups. The 3,3,3-trifluoropropyl group is preferred as the fluorine-substituted monovalent hydrocarbon group. By introducing a fluorine atom into the organopolysiloxane of formula (1), it may be possible to further reduce the dielectric constant of a cured product obtained from the composition of the present invention.

The viscosity of the organosiloxane or organopolysiloxane expressed by formula (1) above at 25° C. is preferably 1 to 10,000 mPa-s, more preferably 1 to 2000 mPa-s, and particularly preferably 5 to 1000 mPa-s. The viscosity of the organosiloxane or organopolysiloxane can be adjusted by changing the ratio of a and b in formula (1) as well as the molecular weight.

In one preferred aspect, the organosiloxane or organopolysiloxane of component (A) is a compound expressed by the following formula (3):

[Formula 4]

(3)

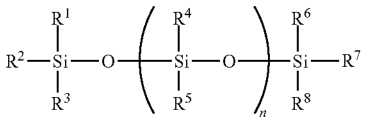

Similar to the compound expressed by formula (1) above, the organosiloxane or organopolysiloxane expressed by formula (3) has on average two or more UV reactive functional groups per molecule. In formula (3), of all $R^1$ to $R^8$ groups, an average of two or more per molecule are UV reactive functional groups. The UV reactive functional group is an organic group capable of generating a bond between each other by UV irradiation in the presence or absence of a photoinitiator. Examples of the UV reactive functional groups can include radical polymerizable groups and cationic polymerizable groups. Radical polymerizable groups are not particularly limited so long as they are a functional group that can form a new bond by a radical reaction mechanism, and particularly a bond between radical polymerizable groups. Examples can include acrylic groups, methacrylic groups, maleimide groups, and organic groups containing any of these groups. Specific examples of the radical polymerizable group include groups such as acryloxypropyl, methacryloxypropyl, acrylamidopropyl, methacrylamidopropyl, 3-(N-maleimido)propyl, and the like. Examples of cationic polymerizable groups include vinyl ether groups, epoxy group-containing groups, oxetane group-containing groups, and other groups, such as $CH_2{=}CH{-}O{-}(CH_2)_n{-}$ (where n is an integer from 3 to 20), glycidyloxy $-(CH_2)_n-$ (where n is an integer from 3 to 20), 3,4-epoxycyclohexyl $-(CH_2)_n-$ (where n is an integer from 2 to 20), and the like.

One or more types of epoxy group-containing groups are preferred as the UV reactive functional group. An example of a particularly preferred group includes an epoxycyclohexylalkyl group, and particularly a 3,4-epoxycyclohexylethyl group.

In formula (3), $R^1$ to $R^8$ other than the UV reactive functional groups are each independently an unsubstituted or fluorine-substituted monovalent hydrocarbon group, and preferably a group selected from unsubstituted or fluorine substituted alkyl, cycloalkyl, arylalkyl, and aryl groups having 1 to 20 carbon atoms. Examples of the alkyl groups above include methyl, ethyl, n-propyl, isopropyl, n-butyl, tert-butyl, sec-butyl, pentyl, octyl, and other groups, and methyl groups are particularly preferable. Examples of the cycloalkyl groups above include cyclopentyl, cyclohexyl, and the like. Examples of the arylalkyl groups above include benzyl, phenylethyl groups, and the like. Examples of the aryl groups above include phenyl groups, naphthyl groups, and the like. Examples of fluorine-substituted monovalent hydrocarbon groups include 3,3,3-trifluoropropyl and 3,3,4,4,5,5,5,6,6,6-nonafluorohexyl groups. The 3,3,3-trifluoropropyl group is preferred as the fluorine-substituted monovalent hydrocarbon group. By introducing a fluorine atom into the organopolysiloxane of formula (3), it may be possible to further reduce the dielectric constant of a cured product obtained from the composition of the present invention.

The number of UV reactive functional groups provided by the organosiloxane and/or organopolysiloxane of formula (3), serving as component (A), as a whole is 2 to 6 on average per molecule, preferably 2 to 5, particularly preferably 2 to 4.

In particular, one of $R_1$ to $R_3$ in formula (3) and one of $R_6$ to $R_8$ are preferably UV reactive functional groups. Furthermore, one of $R_1$ to $R_3$ in formula (3) and one of $R_6$ to $R_8$ are particularly preferably UV reactive functional groups.

For n in formula (3), the viscosity of the organosiloxane or organopolysiloxane expressed by formula (3) above at 25° C. is preferably 1 to 10,000 mPa-s, more preferably 1 to 2000 mPa-s, and particularly preferably 5 to 1000 mPa-s. A person with ordinary skill in the art can easily determine the value of n without excess trial and error such that the viscosity of the organosiloxane or organopolysiloxane of formula (3) is within the aforementioned viscosity range. In general, however, the number of n is preferably between 0 and 500, and more preferably within a range of 0 to 100, such that the compound of formula (3) has a desired viscosity.

The organosiloxane or organopolysiloxane of formula (3) can be used as one type or as a mixture of two or more types. When two or more types of the organosiloxane and/or organopolysiloxane are used as a mixture, the viscosity of the mixture at 25° C. is preferably 1 to 10,000 mPa-s, more preferably 1 to 2000 mPa-s, and particularly preferably 5 to 1000 m Pa-s.

Furthermore, the compound of formula (1) above may be an organopolysiloxane expressed by the following average unit formula (4).

Average unit formula:

$$R_3SiO_{1/2})e(R_2SiO_{2/2})_f(RSIO_{3/2})g(SiO_{4/2})_5 \quad (4)$$

In formula (4), R is independently a group selected from UV reactive functional groups, monovalent hydrocarbon groups unsubstituted or substituted with fluorine, at least two of all Rs are UV reactive functional groups, (g+h) is a positive number, e is 0 or a positive number, and f is a number within a range of 0 to 100.

The UV reactive functional groups and monovalent hydrocarbon groups are as defined above for formula (1). Furthermore, a preferred viscosity of the organopolysiloxane expressed by formula (4) is as specified above for the organopolysiloxane expressed by formula (1).

Specific examples of organosiloxanes or organopolysiloxanes expressed by (1) above are 1,3-bis(3,4-epoxycyclohexylethyl)-1,1,3,3-tetramethyldisiloxane, 1,5-bis(3,4-epoxycyclohexylethyl)-1,1,1,3,3,5,5-hexamethyltrisiloxane, methyl tris(3,4-epoxycyclohexylethyldimethylsiloxy)silane, tetrakis(3,4-epoxycyclohexylethyldimethylsiloxy)silane, both-end terminated (3,4-epoxycyclohexylethyldimethylsilyl)-polydimethylsiloxane, both-end terminated trimethylsilyl-dimethylsiloxy/(methyl-3,4-epoxycyclohexylethylsiloxy) copolymers, and both-end terminated (3,4-epoxycyclohexylethyldimethylsiloxy)-dimethylsiloxy/(methyl-3,4-epoxycyclohexylethylsiloxy)copolymers.

The organosiloxane or organopolysiloxane expressed by formula (3) above and the organopolysiloxane expressed by formula (4) above can each be individually one type, or optionally a combination of two or more types. In other words, the organosiloxane or organopolysiloxane expressed by formula (3), the organopolysiloxane expressed by formula (4), and mixtures of two types or more arbitrarily selected therefrom can be used as component (A) of the composition of the present invention.

[Component (B): Organosilane, Organosiloxane, and/or Organopolysiloxane Having one UV Reactive Functional Group in one Molecule]

Component (B) has one UV reactive functional group per molecule in an organosilane, organosiloxane, or organopolysiloxane skeleton, and has an effect of controlling a crosslinking density of a cured product obtained from the composition of the present invention and reducing the dielectric constant while simultaneously reducing the viscosity of the composition. A molecular structure thereof can be arbitrary so long as the objective can be achieved. In general, the organosilane, organosiloxane, and/or organopolysiloxane of component (B) is preferably a straight chain, branched, or cyclic organopolysiloxane, or an organosilane expressed by average compositional formula:

$$R_cR'_dSiO_{(4-c-d/2} \quad (2)$$

(where R is a UV curable functional group,

R' is a group selected from monovalent hydrocarbon groups, hydroxyl groups, and alkoxy groups, excluding the UV curable functional group above, and c and d are numbers that satisfy the following conditions: $1 \le c+d \le 3$ and $0.05 \le c/(c+d) \le 0.25$.

Moreover, the number of Rs in the molecule is 1.).

The UV reactive functional group expressed by R in formula (2) is an organic group capable of generating a bond between each other by UV irradiation in the presence or absence of a photoinitiator. Examples of the UV reactive functional groups can include radical polymerizable groups and cationic polymerizable groups. Radical polymerizable groups are not particularly limited so long as they are a functional group that can form a new bond by a radical reaction mechanism, and particularly a bond between radical polymerizable groups. Examples can include acrylic groups, methacrylic groups, maleimide groups, and organic groups containing any of these groups. Specific examples of the radical polymerizable group include groups such as acryloxypropyl, methacryloxypropyl, acrylamidopropyl, methacrylamidopropyl, 3-(N-maleimido)propyl, and the like. Examples of cationic polymerizable groups include vinyl ether groups, epoxy group-containing groups, oxetane group-containing groups, and other groups, such as $CH_2{=}CH{-}O{-}(CH_2)_n{-}$ (where n is an integer from 3 to 20), glycidyloxy $-(CH_2)_n-$ (where n is an integer from 3 to 20), 3,4-epoxycyclohexyl $-(CH_2)_n-$ (where n is an integer from 2 to 20), and the like.

One or more types of epoxy group-containing groups are preferred as the UV reactive functional group. An example of a particularly preferred group includes an epoxycyclohexylalkyl group, and particularly a 3,4-epoxycyclohexylethyl group. The straight chain, branched, or cyclic organopolysiloxane or the organosilane expressed by the average compositional formula above have one UV reactive functional group (R) in one molecule.

The monovalent hydrocarbon group expressed by R' is a monovalent hydrocarbon group, which includes unsubstituted monovalent hydrocarbon groups and fluorine-substituted monovalent hydrocarbon groups. The unsubstituted or fluorine-substituted monovalent hydrocarbon group is preferably a group selected from unsubstituted or fluorine substituted alkyl, cycloalkyl, arylalkyl, and aryl groups having 1 to 20 carbon atoms. Examples of the alkyl groups above include methyl, ethyl, n-propyl, isopropyl, n-butyl, tert-butyl, sec-butyl, pentyl, octyl, and other groups, and methyl groups are particularly preferable. Examples of the cycloalkyl groups above include cyclopentyl, cyclohexyl, and the like. Examples of the arylalkyl groups above include benzyl, phenylethyl groups, and the like. Examples of the aryl groups above include phenyl groups, naphthyl groups, and the like. Examples of fluorine-substituted monovalent hydrocarbon groups include 3,3,3-trifluoropropyl and 3,3,4,4,5,5,5,6,6,6-nonafluorohexyl groups. The 3,3,3-trifluoropropyl group is preferred as the fluorine-substituted monovalent hydrocarbon group. By introducing a fluorine atom into the organopolysiloxane of formula (2), it may be possible to further reduce the dielectric constant of a cured product obtained from the composition of the present invention.

The viscosity of the organosiloxane or organopolysiloxane, or organosilane expressed by formula (2) above at 25° C. is preferably 1 to 500 mPa-s, more preferably 1 to 100 mPa-s, and particularly preferably 5 to 50 mPa-s. The viscosity of the organosiloxane or organopolysiloxane can be adjusted by changing the ratio of c and d in formula (2) as well as the molecular weight.

In one preferred aspect, the organosilane, organosiloxane or organopolysiloxane of component (B) is an organosiloxane or organopolysiloxane compound expressed by the following formula (3'):

[Formula 5]

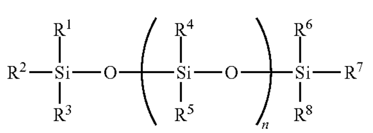

(3')

Similar to the compound expressed by formula (2) above, the UV reactive functional group is an organic group capable of generating a bond between each other by UV irradiation in the presence or absence of a photoinitiator. Examples of the UV curable functional groups can include radical polymerizable groups and cationic polymerizable groups. Radical polymerizable groups are not particularly limited so long as they are a functional group that can form a new bond by a radical reaction mechanism, and particularly a bond between radical polymerizable groups. Examples can include acrylic groups, methacrylic groups, maleimide groups, and organic groups containing any of these groups. Specific examples of the radical polymerizable group include groups such as acryloxypropyl, methacryloxypropyl, acrylamidopropyl, methacrylamidopropyl, 3-(N-maleimido)propyl, and the like. Examples of cationic polymerizable groups include vinyl ether groups, epoxy group-containing groups, oxetane group-containing groups, and other groups, such as $CH_2$═CH—O—$(CH_2)_n$— (where n is an integer from 3 to 20), glycidyloxy-$(CH_2)_n$— (where n is an integer from 3 to 20), 3,4- epoxycyclohexyl —$(CH_2)_n$— (where n is an integer from 2 to 20), and the like.

One or more types of epoxy group-containing groups are preferred as the UV reactive functional group. An example of a particularly preferred group includes an epoxycyclohexylalkyl group, and particularly a 3,4-epoxycyclohexylethyl group.

In formula (3'), $R^1$ to $R^8$ other than the UV reactive functional groups are each independently an unsubstituted or fluorine-substituted monovalent hydrocarbon group, and preferably a group selected from unsubstituted or fluorine substituted alkyl, cycloalkyl, arylalkyl, and aryl groups having 1 to 20 carbon atoms. Examples of the alkyl groups above include methyl, ethyl, n-propyl, isopropyl, n-butyl, tert-butyl, sec-butyl, pentyl, octyl, and other groups, and methyl groups are particularly preferable. Examples of the cycloalkyl groups above include cyclopentyl, cyclohexyl, and the like. Examples of the arylalkyl groups above include benzyl, phenylethyl groups, and the like. Examples of the aryl groups above include phenyl groups, naphthyl groups, and the like. Examples of fluorine-substituted monovalent hydrocarbon groups include 3,3,3-trifluoropropyl and 3,3,4,4,5,5,5,6,6,6-nonafluorohexyl groups. The 3,3,3-trifluoropropyl group is preferred as the fluorine-substituted monovalent hydrocarbon group. By introducing a fluorine atom into the organopolysiloxane of formula (3'), it may be possible to further reduce the dielectric constant of a cured product obtained from the composition of the present invention.

The organosiloxane or organopolysiloxane expressed by formula (3') has one UV reactive functional group in one molecule.

There is no limitation to the position of the UV curable functional group in the organosiloxane or organopolysiloxane expressed by formula (3'), and a molecular end group, in other words, one of $R_1$ to $R_3$ or one of $R_6$ to $R_8$ may be a UV reactive functional group. Moreover, a non-end group, in other words, one of $R_4$ and $R_5$ can be a UV reactive functional group.

Specific examples of organosiloxanes or organopolysiloxanes having one UV reactive functional group in the molecule, which is expressed by formula (3'), include 1-(3,4-(epoxycyclohexylethyl)-1,1,3,3,3-pentamethyldisiloxane, 1-(3,4-epoxycyclohexylethyl)-1,1,3,3,5,5,5-heptamethyltrisiloxane, 3-(3,4-epoxycyclohexylethyl)-1,1,1,3,5,5,5-heptamethyltrisiloxane, and 1-(3,4-epoxycyclohexylethyl)-1,1,3,3,5,5,7,7,7-nonamethyltetrasiloxane.

For n in formula (3'), the viscosity of the organosiloxane or organopolysiloxane expressed by formula (3') above at 25° C. is preferably 1 to 500 mPa-s, more preferably 1 to 100 mPa-s, and particularly preferably 5 to 50 mPa-s. A person with ordinary skill in the art can easily determine the value of n without excess trial and error such that the viscosity of the organosiloxane or organopolysiloxane of formula (3') is within the aforementioned viscosity range. In general, however, the number of n is preferably between 0 and 100, and more preferably within a range of 0 to 10, such that the compound of formula (3') has a desired viscosity.

The organosiloxane or organopolysiloxane of formula (3') can be used as one type or as a mixture of two or more types. When two or more types of the organosiloxane and/or organopolysiloxane are used as a mixture, the viscosity of the mixture at 25° C. is preferably 1 to 500 mPa-s, more preferably 1 to 100 mPa-s, and particularly preferably 5 to 50 mPa-s.

Furthermore, the compound of formula (2) above may be a cyclic organopolysiloxane expressed by the following formula (5).

Formula:

[Formula 6]

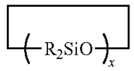

(5)

In formula (5), R is independently a group selected from UV reactive functional groups and monovalent hydrocarbon groups unsubstituted or substituted with fluorine, x is an integer of 3 to 10, and only one UV reactive functional group is provided in a molecule.

The UV reactive functional groups and monovalent hydrocarbon groups are as defined for formula (2) above. Specific examples of organosilanes expressed by formula (5) include 3,4-epoxycyclohexylethyl-pentamethylcyclotrisiloxane, 3,4-epoxycyclohexylethyl-heptamethylcyclotetrasiloxane, and 3,4-epoxycyclohexylethyl-nonamethylcyclopentasiloxane.

On the other hand, a preferred viscosity of the organopolysiloxane expressed by formula (5) is as specified above for the organopolysiloxane expressed by formula (2).

Furthermore, the compound of formula (2) above may be an organosilane expressed by the following formula (6).

Formula: $RSiR'_3$ (6)

In formula (6), R is a UV reactive functional group, and R' is a group selected from monovalent hydrocarbon groups, hydroxyl groups, and alkoxy groups excluding the UV reactive functional group.

The UV reactive functional group and monovalent hydrocarbon group are as defined for formula (2) above, and the alkoxy group is an alkoxy group with 1 to 20 carbon atoms, preferably 1 to 6 carbon atoms, and more preferably 1 to 3 carbon atoms, or a cycloalkyl group with 5 to 20 carbon atoms. Specifically, a methoxy group, ethoxy group, isopropoxy group, cyclopentyl group, or cyclohexyl group is preferred.

Specific examples of organosilanes expressed by formula (6) include 3,4-epoxycyclohexylethyl triethylsilane, 3,4-epoxycyclohexylethyl dimethylphenylsilane, 3,4-epoxycyclohexylethyl dimethyloctylsilane, 3,4-epoxycyclohexylethyl dimethylcyclohexylsilane, 3,4-epoxycyclohexylethyl trihexylsilane, and 3,4-epoxycyclohexylethyl tributylsilane.

Furthermore, a preferred viscosity of the organopolysiloxane expressed by formula (6) is as previously specified for the organopolysiloxane expressed by formula (2).

If the UV reactive functional group provided by the organosiloxane and/or organopolysiloxane expressed by formula (1), (3), or (4) is a radical polymerizable group, then the UV reactive functional group provided by the organosilane expressed by formula (2), (3'), (5), or (6), or straight chain, branched, or cyclic organopolysiloxane is also preferably a radical polymerizable group. Furthermore, if the UV reactive functional group of the organosiloxane or organopolysiloxane expressed by formula (1), (3), or (4) is a cationic polymerizable functional group, then the UV reactive functional group provided by the organosilane expressed by formula (2), (3'), (5), or (6), or the straight chain, branched, or cyclic organopolysiloxane is also preferably a cationic polymerizable functional group, such as a group selected from epoxy groups, glycidyloxy groups, vinyl ether groups, and the like.

The organosiloxane or organopolysiloxane expressed by formula (2) or (3') above, the cyclic organopolysiloxane expressed by formula (5) above, or the organosilane expressed by formula (6) above can each be individually one type, or optionally a combination of two or more types. In other words, the organosiloxane or organopolysiloxane expressed by formula (2) or (3'), the cyclic organopolysiloxane expressed by formula (5), or the organosilane expressed by formula (6), and mixtures of two types or more arbitrarily selected therefrom can be used as component (B) of the composition of the present invention.

[Photopolymerization Initiator]

In addition to the components (A) and (B) above, a photopolymerization initiator can be added to the UV curable organopolysiloxane composition of the present invention if desired. In this case, when the UV reactive functional group provided by component (A) and component (B) is a cationic polymerizable functional group containing epoxy, vinylether, or the like, a photocationic polymerization initiator is used as the photopolymerization initiator. Well known photocationic polymerization initiators include compounds that can generate Bronsted acids or Lewis acids by UV or electron beam irradiation, and are so-called photoacid generators, and it is known that irradiation of ultraviolet rays or the like generates an acid, which causes a reaction between cationic polymerizable functional groups. Furthermore, when the UV reactive functional group is a radical polymerizable functional group, a photoradical polymerization initiator can be used as the photopolymerization initiator. The photoradical polymerization initiator generates free radicals by irradiating ultraviolet rays or electron beams, which trigger a radical polymerization reaction, to cure the composition of the present invention. When the composition of the present invention is cured by electron beam irradiation, a polymerization initiator is normally not required.

(1) Photocationic Polymerization Initiator

The photocationic polymerization initiator used in the composition of the present invention can be selected from any known in the technical field and is not limited to any particular one. Strong acid generating compounds, such as diazonium salts, sulfonium salts, iodonium salts, phosphonium salts, and the like, are known as photocationic polymerization initiators, and these can be used. Examples of photocationic polymerization initiators include, but are not limited to, bis(4-tert-butylphenyl)iodonium hexafluorophosphate, cyclopropyldiphenylsulfonium tetrafluoroborate, dimethylphenacylsulfonium tetrafluoroborate, diphenyliodonium hexafluorophosphate, diphenyliodonium hexafluoroarsenate, diphenyliodonium tetrafluoromethanesulfonate, 2-(3,4-dimethoxystyryl)-4,6-bis(trichloromethyl)-1,3,5-triazine, 242-[2-(furan-2-Avinyl]-4,6-bis(trichloromethyl)-1,3,5-triazine, 4-isopropyl-4'-methyldiphenyliodonium tetrakis(pentafluorophenyl)borate, 2-[2-(5-methylfuran-2-yl)vinyl]-4,6-bis(trichloromethyl)-1,3,5-triazine, 2-(4-methoxyphenyl)-4,6-bis(trichloromethyl)-1,3,5-triazine, 2-(4-methoxystylyl)-4,6-bis(trichloromethyl)-1,3,5-triazine, 4-nitrobenzenediazonium tetrafluoroborate, triphenylsulfonium tetrafluoroborate, triphenylsulfonium bromide, tri-p-tolylsulfonium hexafluorophosphate, tri-p-tolylsulfonium trifluoromethanesulfonate, diphenyliodonium triflate, triphenylsulfonium triflate, diphenyliodonium nitrate, bis(4-tert-butylphenyl)iodonium perfluoro-1-butane sulfonate, bis(4-tert-butylphenyl)iodonium triflate, triphenylsulfonium perfluoro-1-butanesulfonate, N-hydroxynaphthalimide triflate, p-toluene sulfonate, diphenyliodonium p-toluenesulfonate, (4-tert-butylphenyl) diphenylsulfonium triflate, tris(4-tert-butylphenyl)sulfonium triflate, N-hydroxy-5-norbornene-2,3-dicarboxymide perfluoro-1-butanesulfonate, (4-phenylthiophenyl) diphenylsulfonium triflate, 4-(phenylthio) phenyldiphenylsulfonium triethyltrifluorophosphate, and the like. In addition to the compounds above, examples of photocationic polymerization initiators can include Omnicat 250, Omnicat 270 (above, IGM Resins B.V.), CPI-310B, IK-1 (above, San-Apro Ltd.), DTS-200 (Midori Kagaku Co., Ltd.), and Irgacure 290 (BASF), and other commercially available photoinitiators.

The amount of the photocationic polymerization initiator added to the composition of the present invention is not particularly limited so long as a desired photo-curing reaction occurs, but in general, the photocationic polymerization initiator is preferably used at an amount of 0.1 to 5 mass %, and particularly preferably 0.2 to 3 mass % relative to the total amount of components (A) and (B) of the present invention.

(2) Photoradical Polymerization Initiator

The photoradical polymerization initiators are known to be broadly classified into photofragmentation and hydrogen abstraction types. The photoradical polymerization initiator used in the composition of the present invention can be selected arbitrarily from those known in the technical field, and is not limited to any particular one. Examples of photoradical polymerization initiators include, but are not limited to, acetophenone, p-anisyl, benzyl, benzoin, benzophenone, 2-benzoylbenzoic acid, 4,4'-bis(diethylamino)benzophenone, 4,4'-bis(dimethylamino) benzophenone, benzoin methyl ether, benzoin isopropyl ether, benzoin isobutyl ether, benzoin ethyl ether, 4-benzoylbenzoic acid, 2,2'-bis(2-chlorophenyl)-4,4',5,5'-tetraphenyl-1,2'-biimidazole, methyl 2-benzoylbenzoate, 2-(1,3-benzodioxo1-5-yl)-4,6-bis(trichloromethyl)-1,3,5-triazine, 2-benzyl-2-(dimethylamino)-4'-morpholinobutyrophenone, (±)-camphorquinone, 2-chlorothioxanthone, 4,4'-dichlorobenzophenone, 2,2-diethoxyacetophenone, 2,2-dimethoxy-2-phenylacetophenone, 2,4-diethylthioxanthene-9-one, diphenyl(2,4,6-trimethylbenzoyl)phosphine oxide, ethyl(2,4,6-trimethylbenzoyl)phenyl phosphinate, 1,4-dibenzoylbenzene, 2-ethylanthraquinone, 1-hydroxycyclohexylphenyl ketone, 2-hydroxy-2-methylpropiophenone, 2-hydroxy-4'-(2-hydroxyethoxy)-2-methylpropiophenone, 2-isopropylthioxanthone, lithium phenyl(2,4,6-trimethylbenzoyl)phosphinate, 2-methyl-4'-(methylthio)-2-morpholinopropiophenone, 2-isonitrosopropiophenone, 2-phenyl-2-(p-toluenesulfonyloxy)acetophenone, and phenylbis(2,4,6-trimethylbenzoyl) phosphine oxide, and the like. Furthermore, in addition to the compounds above, examples of the photoradical polymerization initiators can include Omnirad 651, 184, 1173, 2959, 127, 907, 369, 369E, and 379EG (alkylphenone photoradical polymerization initiator, IGM Resins B.V.), Omnirad TPO H, TPO-L, and 819 (acyl phosphine oxide photoinitiators, IGM Resins B.V.), Omnirad MBF and 754 (intramolecular hydrogen extraction type photoinitiators, IGM Resins B.V.), Irgacure OXE01 and OXE02 (oxime ester non-associative polymerization initiator, BASF), and the like.

While the amount of the photoradical polymerization initiator added to the composition of the present invention is not particularly limited so long as the intended photoradical polymerization reaction or photo-curing reaction occurs, it is generally used at an amount of 0.01 to 5 mass %, and preferably 0.05 to 1 mass % relative to the total mass of the composition of the present invention.

Moreover, a photosensitizer may be used in combination with the photocationic polymerization initiator or the photoradical polymerization initiator. Use of a sensitizer can increase the photon efficiency of the polymerization reaction, and is particularly effective when the coating thickness of the composition is relatively thick or when a relatively long-wavelength LED light source is used, because use of longer wavelength light for the polymerization reaction compared to only using a photoinitiator is feasible. While not limited thereto, exemplary known sensitizers include anthracene based compounds, phenothiazine based compounds, perylene based compounds, cyanine based compounds, melocyanine based compounds, coumarin based compounds, benzylidene ketone based compounds, and (thio)xanthene or (thio)xanthone based compounds such as isopropylthioxanthone, 2,4-diethylthioxanthone, squarylium based compounds, (thia)pyrylium based compounds, porphyrin based compounds, etc., used with any photosensitizer capable of being used in the curable composition according to the present invention.

The mass ratio of components (A) and (B) in the composition of the present invention is not particularly limited, but component (A) is less than 75 mass %, preferably less than 60 mass %, particularly preferably less than 55 mass %, and more preferably less than 50 mass % relative to 100 mass % of the total amount of (A) and (B).

Furthermore, a cured product obtained from the curable composition of the present invention can be designed so as to have a desired cured product hardness, tear strength, tensile strength, viscoelasticity including elongation during cutting and the like, pressure sensitive adhesive strength, curing reaction rate, and the like based on the selection of a siloxane chain length, crosslinking density, crosslinking reaction site and structure of component (A) and component (B). For example, molecular design is possible so as to provide physical properties according to an application of the cured product based on the selection of a molecular chain end reactive polymer, selection of a molecular chain side chain reactive polymer, selection of a resin-like or branched polymer, and the like. Thus the cured product is included in the scope of the present invention. Furthermore, the shape of the cured product obtained from the composition of the present invention is not particularly limited, and it may be a thin film coating layer, may be a sheet-like molded product or the like, may be injected into a specific site in an uncured state and then cured to form a filling material, or may be used as a sealing material for a laminated body, display device, or the like or as an intermediate layer.

Furthermore, a cured product obtained from the composition is substantially transparent and can be used for adhering or securing between members, and therefore can be used as an optically clear adhesive (OCA) or optically clear resin (OCR). Furthermore, a cured product obtained from the composition of the present invention can form not only a resin-like cured product with high hardness but also a flexible elastomer-like cured product or gel-like cured product, and therefore may be used for an optical member, an electronic member, a protective material for electronic materials, a functional elastomer, a functional gel, and the like, where a low dielectric constant is required. Furthermore, an additional function may be added by using an additive to be described later or the like.

In particular, a cured product obtained from the compositions of the present invention is characterized by a low dielectric constant, and thus the composition of the present invention is suitable for use as a coating agent or potting agent, particularly as an insulating coating agent or potting agent for electronic and electrical devices.

When the composition of the present invention is used as a coating agent, in order for the composition to have suitable flowability and workability for applying to a substrate, the viscosity of the entire composition at 25° C. is preferably 1 to 100 mPa-s, more preferably 1 to 50 mPa-s, even more preferably 5 to 30 mPa-s, and particularly preferably 5 to 20 mPa-s. In order to adjust the viscosity of the entire composition to a desired viscosity, the organosilane, organosiloxane, and/or organopolysiloxane expressed by formula (1), (2), (3), (3'), (4), (5), and (6) having a viscosity enabling the viscosity of the entire composition to be the desired viscosity are preferably used as components (A) and (B). For this purpose, the molecular weight of the organosiloxane and/or organopolysiloxane expressed by formulas (1) and (2) can be adjusted to a preferred range. Adjustment of the molecular weight can be appropriately performed by selecting R and R' of the organopolysiloxane of formulas (1) and (2) as well as adjusting the degree of polymerization of polysiloxane, adjusting n of formula (3) or formula (3'), adjusting the values of e, f, g, and h of formula (4), selecting R and x of formula (5), or selecting the groups of R and R' of formula (6).

A non-volatile or minimally volatile low molecular weight compound may be added to adjust the viscosity of the composition, improve the coating properties, and adjust the physical properties of a cured product. Such a low molecular weight compound preferably has a molecular weight of 500 or less, is non-volatile or minimally volatile, has a boiling point above 150° C. at ambient pressure, and has a symmetrical molecular structure so as to maintain a low dielectric constant, but is not limited thereto. Furthermore, the compound may have a UV reactive functional group. Examples of such low molecular weight compounds include dodecane, tetradecane, hexadecane, dodecene, tetradecene, hexadecene, allyl glycidyl ether, butyl glycidyl ether, 1,2-epoxy-4-vinylcyclohexane, (3,4-epoxycyclohexyl) methyl acrylate, 3',4'-epoxycyclohexylmethyl-3,4-epoxycyclohexanecarboxylate, 2-(3,4-epoxycyclohexyl)ethyl trimethoxysilane, and the like. The blending amount thereof is an amount required to adjust the viscosity of the composition and may be 5% or less, or even 2% or less, of the entire composition. The low molecular weight compound having an epoxy group can also be called a reactive diluent when the UV curable group in the curable composition is a cationic polymerizable group.

A compound having one or more UV reactive functional groups in one molecule and containing no silicon atom, which acts as a reactive diluent, can be used as component (C). The amount of component (C) is such that the mass ratio of component (C) to the total of component (A), component (B), and component (C) is less than 50%, in order to suppress the dielectric constant from increasing. The mass ratio of component (C) to the total of components (A), (B), and (C) is preferably less than 30%, and more preferably less than 10%.

Component (C) is preferably a compound having one UV reactive functional group in one molecule and containing no silicon atom, and more preferably a compound having one epoxy group in one molecule and containing no oxetane group or silicon atom. Specific examples include the aforementioned allyl glycidyl ether, butyl glycidyl ether, 2-ethylhexyl glycidyl ether, 1,2-epoxy-4-vinylcyclohexanem (3,4-epoxycyclohexyl)methyl acrylate, and the like.

[Component (D)]

When the UV curable organopolysiloxane composition of the present invention is applied to a surface of a substrate as a coating agent using an arbitrary method, in order to improve the wettability of the composition on the substrate and to form a defect-free coating film, component (D) selected from the following is preferably further added to the composition of the present invention containing the aforementioned components. The use of inkjet printing is particularly preferred as a method for coating the composition of the present invention on a substrate. Therefore, component (D) is a component that improves the wettability of the UV curable organopolysiloxane composition of the present invention on a substrate, and particularly significantly improves inkjet printing properties. Component (D) is at least one type of compound selected from a group consisting of the following (D1), (D2), and (D3).

(i) Component (D1)

Component (D1) is a nonionic surfactant that does not contain a silicon atom and is not acrylic, in other words, a nonacrylic nonionic surfactant. "Nonacrylic" means that the surfactant does not have a (meth)acrylate group in a molecule thereof. Examples of surfactants that can be used as component (D1) include glycerol fatty acid esters, sorbitan fatty acid esters, polyoxyethylene alkyl ethers, polyoxyethylene alkyl phenyl ethers, alkyl glycosides, acetylene glycol polyether, and other organic nonionic surfactants, fluorine-based nonionic surfactants, and the like, and one or a combination of two or more types thereof can be used. Specific examples of component (D1) include the EMULGEN Series and RHEODOL series manufactured by Kao Corporation, SURFYNOL 400 series manufactured by Evonik Industries AG, and OLFINE E series manufactured by Nissin Chemical Co., Ltd. as organic nonionic surfactants, and FC-4400 series manufactured by 3M and MEGAFACE 550 and 560 series manufactured by DIC Corporation as fluorine-based nonionic surfactants.
Of these, SURFYNOL 400 series and OLFINE E series, which are alkynol polyethers, are particularly preferred.

(ii) Component (D2) is a nonionic surfactant containing a silicon atom and having an HLB value of 4 or less. Herein, the HLB value is a value that expresses the degree of affinity of a surfactant to water and organic compounds, and herein, a value defined by the Griffin method (20×sum of the formula weight of the hydrophilic portion/molecular weight) is used as the HLB value. Silicone polyether having a polyether as a hydrophilic portion, glycerol silicone having a (di)glycerol derivative as a hydrophilic portion, carbinol silicones having a hydroxyethoxy group as a hydrophilic portion, and the like are known silicon-containing nonionic surfactants. Of these surfactants, those with an HLB value of 4 or less, in other words, those with a hydrophilic portion mass fraction of 20 mass % or less, are preferably used in the composition of the present invention. Of these, carbinol silicone is particularly preferred.

(iii) Component (D3) is a silicone oil having a viscosity of 90 mPa-s or less at 25° C. Examples of silicone oils include both-end terminated trimethylsilyl-polydimethylsiloxane, both-end terminated dimethylvinylsilyl-polydimethylsiloxane, both-end terminated trimethylsilyl-dimethylsiloxy/methylvinylsiloxy copolymers, both-end terminated dimethylvinylsilyl-dimethylsiloxy/methylvinylsiloxy copolymers, both-end terminated trimethylsilyl-dimethylsiloxy/methylphenylsiloxy copolymers, both-end terminated trimethylsilyl-dimethylsiloxy/diphenylsiloxy copolymers, both-end terminated dimethylvinylsilyl-dimethylsiloxy/methylphenylsiloxy copolymers, both-end terminated dimethylvinylsilyl-dimethylsiloxy/diphenylsiloxy copolymers, and the like. Both-end terminated trimethylsilyl-polydimethylsiloxane and both-end terminated dimethylvinylsilyl-polydimethylsiloxane can be preferably used. A preferred viscosity range of the silicone oil is 2 to 50 mPa-s. A more preferred range is 2 to 30 mPa-s, and an even more preferred viscosity range is 5 to 20 mPa-s. Note that viscosity values herein were measured at 25° C. using a rotational viscometer described in the Examples.

Components (D1) through (D3) described above can be one or a combination of two or more thereof. The amount of component (D) in the curable composition is not particularly limited, but the total of components (D1) to (D3) (collectively referred to as component (D)) is preferably 0.05 mass % or more and 1 mass % or less relative to the total amount of 100 mass % of components (A) to (C) described above. This is because if the amount of component (D) is less than 0.05 mass % relative to a total amount of 100 mass % of components (A) to (C), an effect of improving the wettability of the curable composition to a substrate may not be sufficient, and if the amount of component (D) exceeds 1 mass % relative to a total amount of 100 mass % of components (A) to (C), there is a risk that component (D) may bleed out from a cured product after curing.

As component (D), a silicone oil of component (D3) is preferably used alone, or component (D3) is preferably used in combination with one or more components selected from a group consisting of component (D1) and component (D2). Component (D3) is preferably used alone as component (D).

Other Additives

In addition to the aforementioned components, an additional additive may be added to the composition of the present invention if desired. Examples of additives include, but are not limited to, those described below.

[Adhesion Imparting Agent]

An adhesion promoter can be added to the composition of the present invention to improve adhesion and close fitting properties to a substrate in contact with the composition. When the curable composition of the present invention is used for applications such as coating agents, sealing materials, and the like that require adhesion or close fitting properties to a substrate, an adhesion imparting agent is preferably added to the curable composition of the present invention. An arbitrary known adhesion promoter can be used, so long as the adhesion promoter does not interfere with a curing reaction of the composition of the present invention.

Examples of such adhesion promoters that can be used in the propyl include: organosilanes having a trialkoxysiloxy group (such as a trimethoxysiloxy group or a triethoxysiloxy group) or a trialkoxysilylalkyl group (such as a trimethoxysilylethyl group or triethoxysilylethyl groups) and a hydrosilyl group or an alkenyl group (such as a vinyl group or an allyl group), or organosiloxane oligomers having a straight chain structure, branched structure, or cyclic structure with approximately 4 to 20 silicon atoms; organosilanes having a trialkoxysiloxy group or a trialkoxysilylalkyl group and a methacryloxyalkyl group (such as a 3-methacryloxypropyl group), or organosiloxane oligomers having a straight chain structure, branched structure, or cyclic structure with approximately 4 to 20 silicon atoms; organosilanes having a trialkoxysiloxy group or a trialkoxysilylalkyl group and an epoxy group-bonded alkyl group (such as a 3-glycidoxypropyl group, a 4-glycidoxybutyl group, a 2-(3,4-epoxycyclohexyl)ethyl group, or a 3-(3,4-epoxycyclohexyl)

propyl group), or organosiloxane oligomers having a straight chain structure, branched structure, or cyclic structure with approximately 4 to 20 silicon atoms; organic compounds having two or more trialkoxysilyl groups (such as trimethylsilyl groups or triethoxysilyl groups); reaction products of aminoalkyltrialkoxysilane and epoxy group-bonded alkyltrialkoxysilane, and epoxide groups-containing ethyl polysilicate. Specific examples thereof include vinyl trimethoxysilane, allyl trimethoxysilane, allyl triethoxysilane, hydrogen triethoxysilane, 3-glycidoxypropyl trimethoxysilane, 3-glycidoxypropyl triethoxysilane, 2-(3,4-epoxycyclohexyl)ethyl trimethoxysilane, 3-methacryloxypropyl trimethoxysilane, 3-methacryloxypropyl triethoxysilane, 1,6-bis(trimethoxysilyl)hexane, 1,6-bis(triethoxysilyl)hexane, 1,3-bis[2-(trimethoxysilyl)ethyl]-1,1,3,3-tetramethyldisiloxane, reaction products of 3-glycidoxypropyl triethoxysilane and 3-aminopropyl triethoxysilane, condensation reaction products of a methylvinyl siloxane oligomer blocked with a silanol group and a 3-glycidoxypropyl trimethoxysilane, condensation reaction products of a methylvinyl siloxane oligomer blocked with a silanol group and a 3-methacryloxypropyl triethoxysilane, tris(3-trimethoxysilylpropyl)isocyanurate.

The amount of the adhesion promoter to be added to the curable composition of the present invention is not particularly limited. However, since it does not promote curing properties of the curable composition or discoloration of a cured product, the amount is preferably within a range of 0.01 to 5 parts by mass, or within a range of 0.01 to 2 parts by mass, relative to a total of 100 parts by mass of components (A) and (B).

[Other Additives]

Another additive may be added to the composition of the present invention in addition to or in place of the adhesion imparting agent described above, if desired. Examples of additives that can be used include leveling agents, silane coupling agents not included in those listed above as adhesion imparting agents, UV absorbers, antioxidants, polymerization inhibitors, fillers (reinforcing fillers, insulating fillers, thermal conductive fillers, and other functional fillers), and the like. If necessary, an appropriate additive can be added to the composition of the present invention. Furthermore, a thixotropy imparting agent may also be added to the composition of the present invention if necessary, particularly when used as a potting agent or sealing agent.

[Dielectric Constant of Cured Product of Composition of Present Invention]

A cured product obtained from the UV curable organopolysiloxane composition of the present invention can have a low dielectric constant, which can be less than 3.0, and preferably less than 2.8. Note that the dielectric constant is a value measured at 23° C. and 100 kHz.

[Application]

The UV curable organopolysiloxane composition of the present invention can be cured not only by ultraviolet rays but also by electron beams, which is another aspect of the present invention.

The composition of the present invention can be used as an insulating material by utilizing the low dielectric constant of a cured product obtained therefrom. Specifically, the composition of the present invention is particularly useful as a material for forming an insulating layer forming various articles, particularly electronic and electrical devices. The composition of the present invention can be applied on a substrate or sandwiched between two substrates, at least one of which includes a material that allows ultraviolet rays or electron beams to pass, and the composition can be cured by irradiating ultraviolet rays or electron beams to form an insulating layer. In this case, the composition of the present invention can be patterned when applied to a substrate, and then the composition can be cured. Alternatively, the composition can be applied to a substrate, and cured and uncured portions can be left during curing by ultraviolet rays or electron beam irradiation. Thereafter, an uncured portion can be removed with a solvent to form an insulating layer having a desired pattern.

The curable composition of the present invention is particularly suitable as a material for forming an insulating layer for touch panels and displays and other display devices. In this case, an arbitrary desired pattern may be formed as described above if necessary on the insulating layer. Therefore, a display device such as touch panel, display, or the like containing an insulating layer obtained by curing the UV curable organopolysiloxane composition of the present invention is also an aspect of the present invention.

Furthermore, the curable composition can also be used to form an insulating coating layer (insulating film) by curing after coating an article. Therefore, the composition of the present invention can be used as an insulating coating agent. Furthermore, a cured product formed by curing the curable composition of the present invention can be used as an insulating coating layer.

An insulating film formed from the curable composition of the present invention can be used for various applications. In particular, use is possible as a component of an electronic device or as a material used in a process of manufacturing the electronic device. Electronic devices include semiconductor devices, magnetic recording heads, and other electronic apparatuses. For example, the curable composition of the present invention can be used in an insulating film of a semiconductor device, such as an LSI, system LSI, DRAM, SDRAM, RDRAM, D-RDRAM, or a multi-chip module multilayer circuit board, an interlayer insulating film for a semiconductor, an etch stopper film, a surface protection film, a buffer coat film, a passivation film in LSI, a cover coat for a flexible copper cladding plate, a solder resistant film, and a surface protection film for an optical device.

Furthermore, in addition to use as a coating agent, the UV curable organopolysiloxane composition is suitable for use as a potting agent, and particularly as an insulating potting agent for electronic and electrical devices.

The composition of the present invention can be used as a material for forming a coating layer on a surface of a substrate, particularly using an inkjet printing method. In this case, the composition of the present invention particularly preferably contains component (D) described above.

The present invention is further described below based on Examples, but the present invention is not limited to the Examples below.

EXAMPLES

The UV curable organopolysiloxane composition of the present invention and a cured product thereof are described in detail based on Examples. Note that in the formula, Me and Ep represent a methyl group and a 2-(3,4-epoxycyclohexyl)ethyl group, respectively. Furthermore, measurements and evaluations in the Examples and Comparative Examples were conducted as follows.

[Viscosity of Organopolysiloxane and Curable Organopolysiloxane Composition]

The viscosity (mPa·s) at 25° C. was measured using a rotary viscometer (E type viscometer VISCONIC EMD produced by TOKIMEC CORPORATION).

[Preparation of the Curable Organopolysiloxane Composition]

Each material at the amounts listed in Table 1 below was placed in a brown plastic container and mixed well using a planetary mixer to prepare a curable organopolysiloxane composition.

[Wettability of Curable Organopolysiloxane Composition on Substrate (Contact Angle of Composition)]

Two microliters of the curable composition was dripped onto a silicon nitride coated glass substrate, and the contact angle of the curable composition immediately after dripping and after one minute was measured at 23° C. using a contact angle measuring device DM-700 manufactured by Kyowa Interface Science Co., Ltd. The unit for the contact angle is degrees)(°).

[Inkjet Printing Properties of Curable Organopolysiloxane Composition]

Using OMNIJET 200, an inkjet printing device manufactured by Unijet, and equipped with a KM-1204 print head, the curable composition was applied to a silicon nitride coated glass substrate at a droplet amount of 14 picoliters within a 155×89 $mm^2$ area such that the thickness after curing was 4 micrometers. The application of the curable composition was evaluated as "o" when no uncoated portions were present within the application area and the printing was uniform, and "x" when uncoated portions were present. Furthermore, the droplet size (unit: micrometers) was photographed immediately after the curable composition was applied on the substrate by an inkjet method and one minute after the application, and the spreading properties of the droplets was evaluated (measurement of the droplet size of the composition).

[Curing of the Curable Organopolysiloxane Composition]

A mold having a thickness of 1 mm having circular holes with an inner diameter of 40 mm was placed on a PET film coated with a fluoropolymer release agent, and approximately 1.3 g of the curable organopolysiloxane composition was poured into a hole thereof. A PET film similar to that described above was placed over the composition, and a 10 mm thick glass plate was placed thereon. By irradiating an LED light having a wavelength of 365 nm at an energy amount of 2 J/$cm^2$ from above, the composition was cured to prepare a disk-shaped organopolysiloxane cured product having a diameter of 40 mm and a thickness of 1 mm.

[Dielectric Constant of Organopolysiloxane Cured Product]

A tin foil having a diameter of 33 mm and a thickness of 0.007 mm was pressed onto both surfaces of the prepared organopolysiloxane cured product. In order to improve close fitting properties between the cured product and the foil, a small amount of silicone oil, if necessary, was used for pressing. The capacitance at room temperature (23° C.) and 100 KHz was measured by an E4990A precision impedance analyzer manufactured by Keysight Technologies to which a parallel plate electrode having a diameter of 30 mm was connected. The dielectric constant was calculated using measured capacitance values, separately measured thicknesses of the cured product, and electrode area values.

Examples and Comparative Example 1

UV curable organopolysiloxane composition of the compositions (mass parts) shown in Table 1 were prepared using the following components.

(A) $(EpMe_2Si)_2O$ (B) $EpMeSi(OSiMe_3)_2$ (C) 1,2-epoxy-4-vinylcyclohexane (D1, D2) Catalyst masterbatch containing the following components:

D1: (D1a)/(X)/(Y)=48/2/50 (mass ratio)

D2: (D2a)/(X)/(Y)=48/2/50 (mass ratio)

(D1a): CPI-310B (manufactured by San-Apro Ltd.)

(D2a): 4-isopropyl-4'-methyldiphenyliodonium tetrakis(pentafluorophenyl)borate (X): 2-isopropylthioxanthone (Y): 1,2-epoxy-4-vinylcyclohexane

TABLE 1

| Component | Example 1 | Example 2 | Example 3 | Example 4 | Example 5 | Example 6 | Example 7 | Comparative Example 1 | Comparative Example 2 | Comparative Example 3 |
|---|---|---|---|---|---|---|---|---|---|---|
| (A) | 5.0 | 27.6 | 27.6 | 49.0 | 65.2 | 73.5 | 32.5 | 14.0 | 52.1 | 97.9 |
| (B) | 92.9 | 70.4 | 70.4 | 49.0 | 32.8 | 24.5 | 32.8 | | | |
| (C) | | | | | | | 32.8 | 84.0 | 45.9 | |
| (D1) | | | 2.1 | | | | 2.0 | 2.0 | 2.0 | |
| (D2) | 2.1 | 2.1 | | 2.1 | 2.1 | 2.1 | | | | 2.1 |
| Appearance of curable composition | Transparent | Transparent | Transparent | Transparent | Transparent | Transparent | Transparent | Transparent | Transparent | Transparent |
| Appearance of cured product | Transparent | Transparent | Transparent | Transparent | Transparent | Transparent | Transparent | Transparent | Transparent | Transparent |
| Viscosity of siloxane composition (mPa-s) | 9 | 11 | 11 | 13 | 14 | 15 | 11 | 8 | 12 | 34 |
| Dielectric constant of siloxane cured product | 2.6 | 2.5 | 2.5 | 2.6 | 2.7 | 2.7 | 2.6 | 3.0 | 3.0 | 3.0 |

As shown in the table above, the UV curable organopolysiloxane composition of the present invention (Examples 1 to 7) have viscosities at 25° C. that are suitable for application to a substrate as a coating agent. Furthermore, the UV curable organopolysiloxane compositions of the present invention use an organo(poly)siloxane having two or more UV reactive groups in one molecule and one or more type of silicon-containing compound having one UV reactive functional group in one molecule, and therefore has an effect of reducing the dielectric constant of cured products obtained by UV irradiation. On the other hand, in compositions that do not contain one or more type of silicon-containing compound having one UV reactive functional group in one molecule (Comparative Examples 1 to 3), the dielectric constant of cured products are higher than in Examples 1 to 7.

Examples and Reference Example 2

UV curable organopolysiloxane composition of the compositions (mass parts) shown in Tables 2 and 3 were prepared using the following components.

(A) $(EpMe_2Si)_2O$ (B) $EpMeSi(OSiMe_3)_2$ (D) Following compounds:

D1a: SURFYNOL 420 (manufactured by Evonik Industries AG), HLB value: 4

D1b: OLFINE E1010 (manufactured by Nissin Chemical Co., Ltd.), HLB value: 14

D2a: DOWSIL™ 67 Additive (manufactured by The Dow Chemical Company), HLB value: 12

D2b: DOWSIL™ 5562 Carbinol Fluid (manufactured by The Dow Chemical Company), HLB value: 2

D3a: DOWSIL™ SH 200 Fluid 100 mPa·s (manufactured by The Dow Chemical Company), HLB value: 0

D3b: DOWSIL™ SH 200 Fluid 20 mPa·s (manufactured by The Dow Chemical Company), HLB value: 0

D3c: DOWSIL™ SH 200 Fluid 5 mPa·s (manufactured by The Dow Chemical Company), HLB value: 0

(E) Catalyst masterbatch containing the following components:

E: (E1)/(X)/(B)=30/2.4/67.6 (mass ratio)

(E1): 4-isopropyl-4'-methyldiphenyliodonium tetrakis (pentafluorophenyl)borate (X): 2-isopropylthioxanthone

TABLE 2

| Component | Example 8 | Example 9 | Example 10 | Example 11 | Example 12 | Reference Example 1 | Reference Example 2 | Reference Example 3 |
|---|---|---|---|---|---|---|---|---|
| (A) | 64.6 | 64.6 | 64.6 | 64.6 | 64.6 | 64.6 | 64.6 | 64.6 |
| (B) | 33.6 | 33.6 | 33.6 | 33.6 | 33.6 | 33.6 | 33.6 | 33.6 |
| (D1a) | 0.1 | | | | | | | |
| (D1b) | | 0.1 | | | | | | |
| (D2a) | | | | | | | 0.1 | |
| (D2b) | | | 0.1 | | | | | |
| (D3a) | | | | | | | | 0.1 |
| (D3b) | | | | 0.1 | | | | |
| (D3c) | | | | | 0.1 | | | |
| (E) | 1.7 | 1.7 | 1.7 | 1.7 | 1.7 | 1.7 | 1.7 | 1.7 |
| Total | 100.0 | 100.0 | 100.0 | 100.0 | 100.0 | 99.9 | 100.0 | 100.0 |
| Appearance of curable composition | Transparent | Transparent | Transparent | Transparent | Transparent | Transparent | Transparent | Semi-transparent |
| Appearance of cured product | Transparent | Transparent | Transparent | Transparent | Transparent | Transparent | Transparent | Semi-transparent |
| Viscosity of composition (mPa-s) | 14 | 14 | 14 | 14 | 14 | 14 | 14 | 14 |
| Contact angle of composition: Immediately after dripping (°) | 18 | 18 | 23 | 21 | 21 | 25 | 27 | — |
| Contact angle of composition: 1 minute after dripping (°) | 12 | 11 | 15 | 13 | 13 | 20 | 22 | — |
| Dielectric constant of cured product | 2.7 | 2.7 | 2.7 | 2.7 | 2.7 | 2.7 | 2.7 | — |

TABLE 3

| Component | Example 13 | Example 14 | Example 15 | Reference Example 4 | Reference Example 5 |
|---|---|---|---|---|---|
| (A) | 64.6 | 64.6 | 64.6 | 64.6 | 64.6 |
| (B) | 33.6 | 33.6 | 33.6 | 33.6 | 33.6 |
| (D1a) | | | | | |
| (D1b) | 0.3 | | | | |
| (D2a) | | | | | 0.3 |
| (D2b) | | 0.3 | | | |
| (D3a) | | | | | |
| (D3b) | | | 0.3 | | |
| (D3c) | | | | | |
| (E) | 1.7 | 1.7 | 1.7 | 1.7 | 1.7 |
| Total | 100.2 | 100.2 | 100.2 | 99.9 | 100.2 |
| Applicability | ○ | ○ | ○ | x | x |
| Liquid droplet size of composition: Immediately after dripping (μm) | 130 | 110 | 195 | 100 | 95 |

TABLE 3-continued

| Component | Example 13 | Example 14 | Example 15 | Reference Example 4 | Reference Example 5 |
|---|---|---|---|---|---|
| Liquid droplet size of composition: 1 minute after dripping (μm) | 150 | 110 | 200 | 100 | 95 |

As shown in the Table 2, the UV curable organopolysiloxane compositions of the present invention (Examples 8 to 12) have viscosities at 25° C. that are suitable for application to a substrate as a coating agent, and have high transparency. Furthermore, the UV curable organopolysiloxane compositions of the present invention contain a specific wettability improving agent (such as component D1a or the like), which significantly reduces the contact angle to the substrate. Furthermore, the dielectric constant of a cured product obtained by UV irradiation is also low. On the other hand, the compositions containing the specific wettability improving agent (Examples 8 to 12) have a much lower contact angle to the substrate than the compositions without the specific wettability improving agent (Reference Examples 1 to 3), and have equal or more favorable transparency. Furthermore, the UV curable organopolysiloxane compositions of the present invention were confirmed to have excellent applicability by inkjet printing, as shown in Table 3.

INDUSTRIAL APPLICABILITY

The UV curable organopolysiloxane composition of the present invention is particularly suitable for the applications described above, and particularly as a material for forming an insulating layer for touch panels and displays and other display devices.

The invention claimed is:

1. An ultraviolet (UV) curable organopolysiloxane composition, comprising:

(A) an organosiloxane having an average of two or more UV reactive functional groups in one molecule and conforming to the general formula (3):

(3)

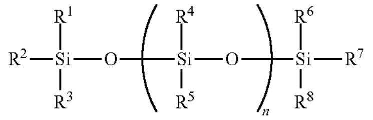

where each of $R^1$ to $R^8$ is independently a monovalent hydrocarbon group unsubstituted or substituted with fluorine, with the proviso that at least each of $R^2$ and $R^7$ is a UV reactive functional group; and n is 0;

(B) an organosiloxane having one UV reactive functional group in one molecule and conforming to the general formula (3'):

(3')

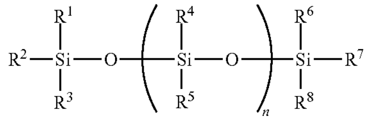

where each of $R^1$ to $R^8$ is independently a monovalent hydrocarbon group unsubstituted or substituted with fluorine, provided that one of $R^4$ or $R^5$ is a UV reactive functional group; and n is 1; and a non-volatile low molecular weight compound having a molecular weight of 500 or less and having an alkenyl group and an epoxy group;

wherein an organic solvent is not included in the composition; and wherein the viscosity of the composition, as measured at 25° C. using an E type viscometer, is 5 to 20 mPa·s.

2. The UV curable organopolysiloxane composition according to claim 1, wherein the UV reactive functional groups are cationic polymerizable functional groups.

3. The UV curable organopolysiloxane composition according to claim 2, wherein the UV reactive functional groups are epoxy group-containing groups.

4. The UV curable organopolysiloxane composition according to claim 1, wherein the non-volatile low molecular weight compound is 1,2-epoxy-4-vinylcyclohexane.

5. The UV curable organopolysiloxane composition according to claim 1, wherein $R^2$ and $R^7$ of component (A) are each 2-(3,4-epoxycyclohexyl)ethyl groups.

6. The UV curable organopolysiloxane composition according to claim 1, wherein $R^4$ or $R^5$ is a 2-(3,4-epoxycyclohexyl)ethyl group.

7. The UV curable organopolysiloxane composition according to claim 1, wherein the number of UV reactive functional groups of component (A) is on average 2 to 4 per molecule.

8. The UV curable organopolysiloxane composition according to claim 1, wherein the ratio of component (A) to the total of 100 mass % of component (A) and component (B) is less than 80 mass %.

9. The UV curable organopolysiloxane composition according to claim 8, wherein the ratio of component (A) to the total of 100 mass % of component (A) and component (B) is less than 50 mass %.

10. The UV curable organopolysiloxane composition according to claim 1, further comprising:

(C) a compound having one or more UV reactive functional groups in one molecule and not having a silicon atom;

wherein the mass ratio of component (C) with regard to the total of component (A), component (B), and component (C) is less than 50%.

11. The UV curable organopolysiloxane composition according to claim 10, wherein component (C) is a compound having one epoxy group in one molecule and not containing an oxetane group and silicon atom.

12. The UV curable organopolysiloxane composition according to claim 1, further comprising:

(D) at least one type of compound selected from a group consisting of:

(D1) a non-acrylic nonionic surfactant not containing a silicon atom;

(D2) a nonionic surfactant containing a silicon atom and having an HLB value of 4 or less; and (D3) a silicone oil having a viscosity of 90 mPa·s or less at 25° C.

13. The UV curable organopolysiloxane composition according to claim 1, wherein the composition includes an oxetane group in a molecule.

14. The UV curable organopolysiloxane composition according to claim 1, wherein the dielectric constant of the composition after curing is less than 2.8.

15. An insulating coating agent, comprising the UV curable organopolysiloxane composition according to claim 1.

16. An insulating coating layer, formed from the UV curable organopolysiloxane composition according to claim 1.

17. A display device, comprising a layer containing a cured product of the UV curable organopolysiloxane composition according to claim 1.

18. The UV curable organopolysiloxane composition according to claim 1, wherein component (A) is $(EpMe_2Si)_2O$, where Me represents a methyl group and Ep represents a 2-(3,4-epoxycyclohexyl)ethyl group.

19. The UV curable organopolysiloxane composition according to claim 1, wherein component (B) is $EpMeSi(OSiMe_3)_2$, where Me represents a methyl group and Ep represents a 2-(3,4-epoxycyclohexyl)ethyl group.

* * * * *